UNITED STATES PATENT OFFICE.

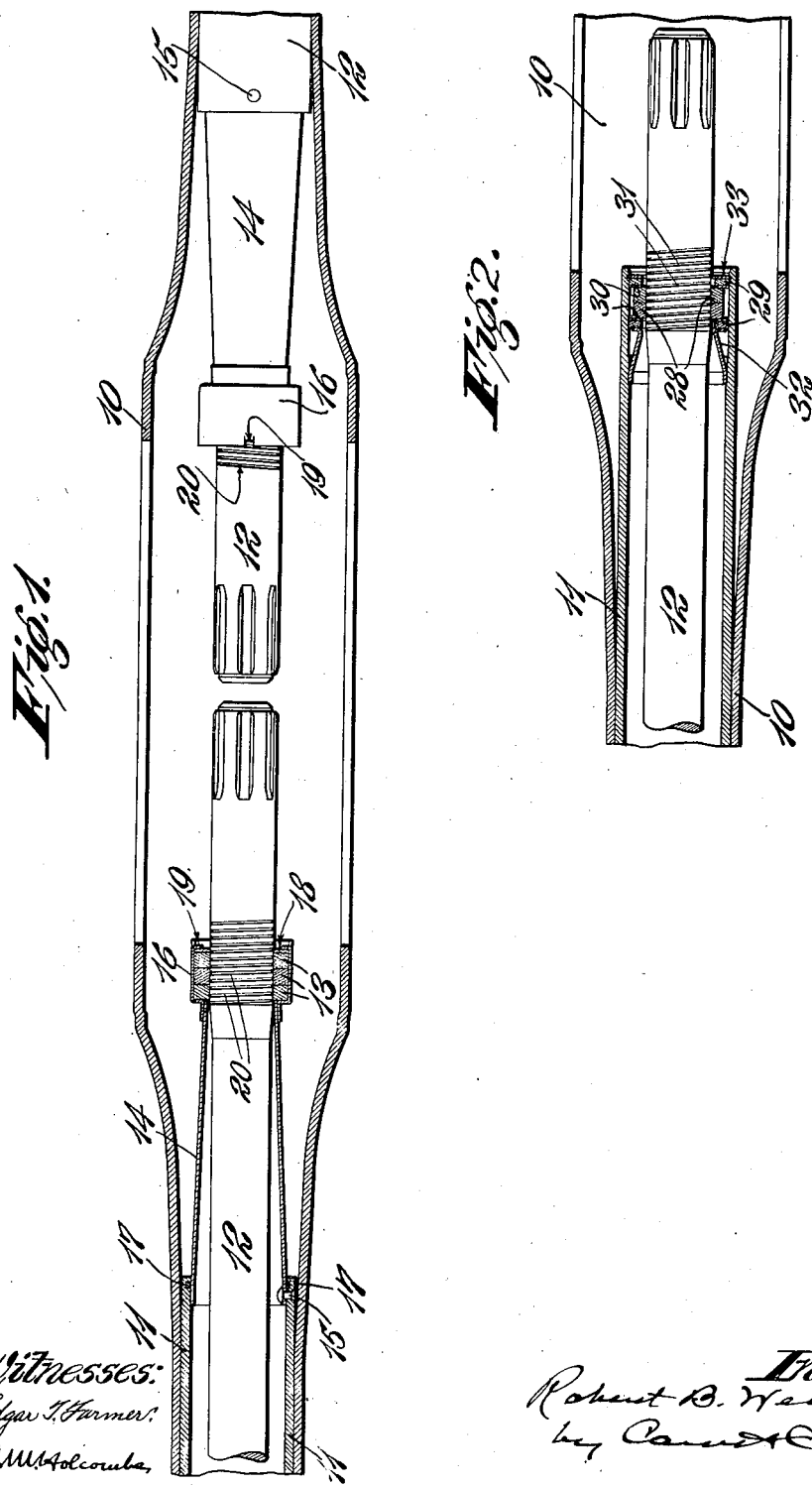

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

DRIVING-AXLE FOR AUTOMOBILES.

1,335,412.  Specification of Letters Patent.  Patented Mar. 30, 1920.

Application filed April 20, 1917. Serial No. 163,381.

*To all whom it may concern:*

Be it known that I, ROBERT B. WEAVER, a citizen of the United States, and a resident of the city of Detroit, in the county of Wayne and State of Michigan, have invented a new and useful Improvement in Driving-Axles for Automobiles, of which the following is a specification.

This invention relates to hollow axles of the type having driving shafts inclosed in a fixed axle casing. The object of the invention is to seal the open ends of the axle casing to prevent oil from creeping along the driving shafts and leaking out at the wheel hubs, where it gets into the brake drums and interferes with the proper working of the brakes. Felt washers have been used for packing the axle ends, but it is difficult to keep the joints tight because the axle shafts can not be maintained in exact axial alinement in the tubular axle casing.

The invention consists in providing the axle shafts with closely fitting packing rings which are so mounted in the fixed axle casing as to be free to follow any slight wabbling of the axle shafts, additional packing being provided for preventing oil from passing between the packing rings and the fixed axle casing.

Further objects and details of the invention appear in the following description of various embodiments of the invention, reference being had to the accompanying drawings. What is claimed as the invention appears in the appended claims.

In the drawings, wherein the same reference characters are used to designate the same or similar parts in the three views, Figure 1 is a longitudinal section of the middle portion of a driving axle, the axle shafts being shown in elevation, and the oil sealing device being shown in section at the left and in elevation at the right of the middle; and Fig. 2 is a longitudinal section of the middle portion of an axle, showing another form of oil sealing device.

In the construction shown in Fig. 1, the axle casing 10 has its ends lined with tubes 11 through which the driving shafts 12 project into the chamber for the differential gears at the middle of the axle. This chamber is filled with lubricant for the gearing, which is prevented from escaping at the ends of the axle by packing rings 13 fitting around the shafts 12 and held in place by two metal sleeves 14, one on each shaft. The sleeves 14 are fitted into the ends of the lining tubes 11, and each sleeve is held in place by means of a loose rivet 15. This arrangement permits the sleeves to move slightly to accommodate any wabbling of the axle shafts. The sleeves 14 taper slightly, the smaller ends extending toward the middle of the axle and each having an annular chamber 16 at its inner end for holding the packing rings 13. There is an annular groove around the large end of the sleeve for receiving a felt washer 17 for keeping oil from creeping between the sleeve and inner wall of the lining tube. The packing rings are held in the chamber 16 by means of a washer 18, which is retained in the open end of the chamber by prongs 19 which are slit from the end of the sleeve and bent in. The shafts 12 are provided with shallow helical grooves 20 around them where they go through the packing rings for impeding the leakage of oil through the rings, the direction of the helical grooves being such that the rotation of the shaft tends to screw the packing toward the middle of the axle.

In the construction shown in Fig. 2, the oil packing rings 28 which fit the axle shaft are mounted in the inner end of the lining 11. The packing rings 28 are loosely held between fixed packing rings 29 in the inner end of the lining tube, metal washers 30 being arranged between the rings 28 and 29. The axle shaft 12 is provided with a helical groove 31 as in the construction shown in Fig. 1. The packing rings 29 are held in the end of the lining 12 between an inner stop member 32 which is tightly pressed into the lining and an outer split washer 33 which is held in place by springing it into a groove in the end of the lining.

The invention is not restricted to the particular details of construction shown and described, as manifestly other forms and arrangements of floating packing rings can be made to answer the purposes of the invention.

I claim the following as my invention:

1. A hollow driving axle having a fixed casing and a wheel driving shaft mounted for rotation therein, the middle of said casing being enlarged to provide a chamber for lubricant, and an oil seal comprising packing rings closely fitting the driving shaft and packing closely fitting the casing, said rings being movable transversely of said packing, and means for preventing leakage between said rings and packing, said means comprising a conical shell whose larger end is loosely mounted on said casing and whose smaller end constitutes a floating support for said rings.

2. A hollow driving axle having a fixed casing and a wheel driving shaft mounted for rotation therein, the middle of said casing being enlarged to provide a chamber for lubricant, packing rings fitting said driving shaft, and a supporting member for said packing rings loosely mounted on and supported in said fixed casing to close the passage surrounding said shaft and permit movement of said packing rings relative to said fixed casing.

3. A hollow driving axle having a fixed casing and a wheel driving shaft mounted for rotation therein, the middle of said casing being enlarged to provide a chamber for lubricant, packing rings fitting the inner end portion of said driving shaft, and a supporting member for said packing rings loosely mounted on and supported in said fixed casing to permit movement of said packing rings relative to said fixed casing, and packing between said supporting member and fixed casing to close the passage surrounding said shaft.

4. A floating driving shaft and hollow axle construction comprising packing rings fitting said driving shaft and floating in said hollow axle, said driving shaft having a spiral groove cut around it where said packing rings are for preventing oil from creeping between said shaft and rings, and means for preventing oil from passing between said floating packing rings and said hollow axle, said means comprising a conical shell whose larger end fits said hollow axle and whose smaller end constitutes a support for said floating packing rings.

5. A hollow driving axle having a fixed casing, wheel driving shafts mounted for rotation therein, inwardly extending tubular members mounted oil-tight in the end portions of said fixed casing and incasing parts of said shafts, and means for packing the space between the inner end portions of said shafts and the adjacent portions of said members so as to permit a floating movement of said shafts.

6. A hollow driving axle having a fixed casing, wheel driving shafts mounted for rotation therein, inwardly extending tubular members mounted oil-tight in the end portions of said fixed casing and incasing parts of said shafts, and means for packing the space between the inner end portions of said shafts and the adjacent portions of said members so as to permit a floating movement of said shafts, said means comprising packing rings fitting the shafts and clear of said members and packing rings fitting said members and clear of the shafts, said first mentioned packing rings being arranged and adapted to be capable of moving transversely relative to said second mentioned packing rings.

Signed at Detroit, Michigan, this 16th day of April, 1917.

ROBERT B. WEAVER.